United States Patent [19]

Sutter

[11] 4,135,573

[45] Jan. 23, 1979

[54] HEAT SHIELDING TOOL

[76] Inventor: Melville B. Sutter, 1 Cromwell Ter., Akron, Ohio 44313

[21] Appl. No.: 736,762

[22] Filed: Oct. 29, 1976

[51] Int. Cl.$^2$ .......................... F28F 13/14; B23K 5/22
[52] U.S. Cl. ........................ 165/80; 165/185; 165/DIG. 7; 228/46; 228/59; 269/254 CS
[58] Field of Search .................. 228/46, 59, 57; 269/254 CS, 254 R; 165/80, 185, DIG. 7

[56] References Cited

U.S. PATENT DOCUMENTS

| 321,618 | 7/1885 | Ludwick | 269/254 CS |
|---|---|---|---|
| 2,496,109 | 1/1950 | Terry | 269/254 R |
| 3,291,476 | 12/1966 | Calkin | 269/254 R |
| 3,358,751 | 12/1967 | Berwald et al. | 165/185 |
| 3,552,630 | 1/1971 | Dean | 228/46 |
| 3,572,428 | 3/1971 | Monaco | 165/185 |
| 3,640,519 | 2/1972 | Halstead | 269/254 R |
| 3,874,443 | 4/1975 | Bayer | 269/254 R |

FOREIGN PATENT DOCUMENTS 96860 11/1922 Switzerland ..................... 269/254 CS Primary Examiner—Charles J. Myhre
Assistant Examiner—Sheldon Richter
Attorney, Agent, or Firm—Reese Taylor

[57] ABSTRACT

A heat shielding tool is disclosed, having a pair of opposed pivotally connected handles terminating in a pair of opposed jaws. The jaws have interiorly relieved arcuate areas so that, when closed, they will form a circle so that the circular opening formed thereby can be clamped about a pipe or tube. The jaws also have external heat dissipating members taking a variety of forms but which can be generally broadly termed fins. In this manner heat generated by soldering a pipe joint will travel along the pipe or tube to the tool and be dissipated into the atmosphere. The handles also have tension means carried thereon which will serve to normally urge the jaws toward mating or closed position so that the tool may be readily clamped about the pipe or tubing.

4 Claims, 3 Drawing Figures

HEAT SHIELDING TOOL

FIELD OF THE INVENTION

This invention in general relates to heat shielding means and, in particular, relates to a tool for use in insulating a previously soldered plumbing connection from the heat generated at another connection which is in the process of being soldered.

DESCRIPTION OF THE PRIOR ART

A problem exists in the prior art with respect of soldering or otherwise securing plumbing connections together. Particularly, in instances where only a short run of pipe or tubing is involved, and assuming one connection to have already been soldered, when the heat is applied to the next connection the heat has a tendency to travel along the pipe or tube and soften the existing connection thereby weakening the overall assembly.

As a practical matter, in the prior art, for years people have wrapped wet rags or similar material about the presoldered connection so as to insulate it from the heat employed in soldering the next connection. In addition to being a rather sloppy method of proceeding, this is also an inefficient method.

Additionally, the patent prior art, such as, for example, Berwald, U.S. Pat. No. 3,358,751 has attempted to overcome problems of this general type by utilizing a heat sink, used in soldering wires to terminal members, wherein a heat regulating member is formed into two semi-circular sections and carried by a spring-loaded handle so that the handle will normally urge the two sections into engagement with each other. This tool engages a barrel shaped terminal and serves to cool it during soldering. Calkin, U.S. Pat. No. 3,291,476 also shows a scissor or plier-like arrangement for soldering electrical connections wherein lips or flanges engage the piece to be soldered with the overall device serving also as a heat sink.

None of the prior art devices, however, disclose a simple, economical yet efficient clamp for use in soldering plumbing connections which is capable of accommodating the standard sizes of pipe or tubing to effectively dissipate the heat and thereby prevent heat build up in the pre-existing soldered joint.

SUMMARY OF THE INVENTION

It has been discovered that the problems noted above with regard to soldering or welding joints which are closely adjacent to each other can be remedied by providing a plier-like heat shielding tool, including a pair of pivotally connected opposed handles which have a pair of jaws projecting from their ends.

It has been found that the jaws can be relieved internally in an arcuate fashion so that when the jaws are closed, circular openings are provided which can be clamped about the periphery of the pipe or tube.

It has also been found that the external surfaces of the jaws can be provided with heat dissipating fins so that in effect the plier-like tool serves as a heat exchanger whereby the heat generated at the solder point will travel along the pipe to the tool and then be dissipated to the atmosphere and will be prevented from passing on along the tube to soften or weaken a pre-existing joint.

It has also been discovered that the tool can be readily used by one party by providing spring or tension means carried by the handles to normally urge the tool to its closed or clamping position. In this fashion, the device can simply be opened against the force of the tension means, placed about the pipe and released at which time it will simply stay in place by itself while the welder or plumber utilizes both hands for the soldering operation.

Accordingly, production of an improved heat shielding tool of the character above-described becomes the principal object of this invention with other objects thereof becoming more apparent upon a reading of the following brief specification considered and interpreted in view of the accompanying drawings.

OF THE DRAWINGS

BRIEF DESCRIPTION OF THE PREFERRED EMBODIMENTS

Figure 1:
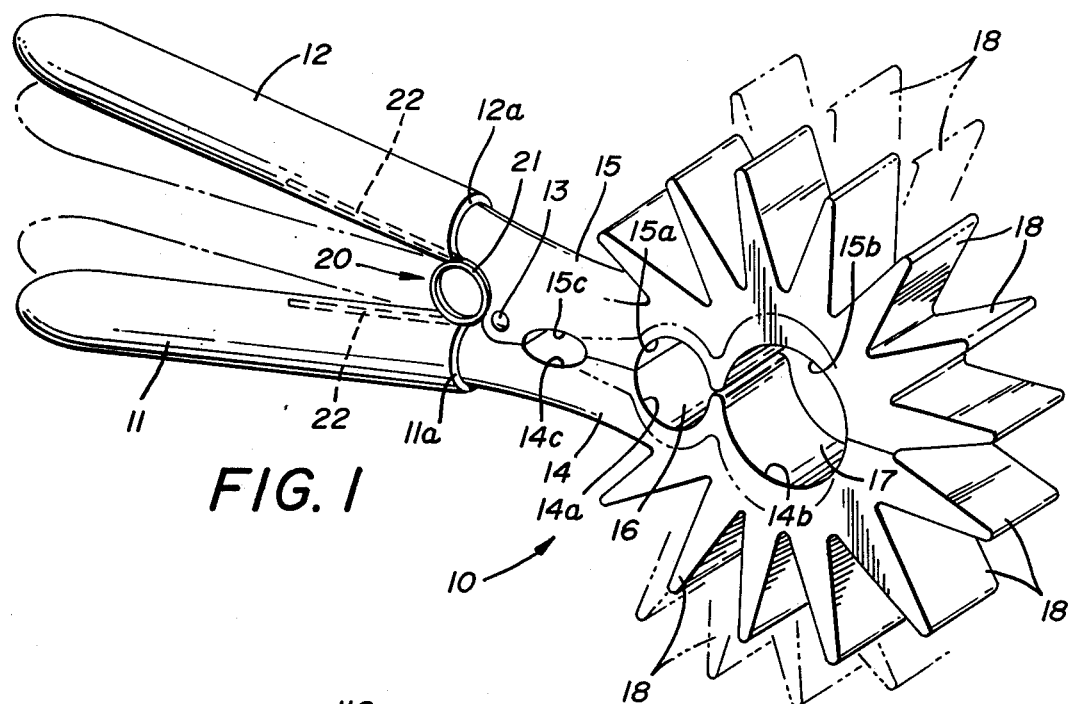
FIG. 1 is a perspective view showing one form of the improved heat shielding tool.

Referring first of FIG. 1, the improved heat shielding tool 10 comprises, in general, a pair of opposed handles 11 and 12 pivotally secured together as at 13 and terminating in jaw portions 14 and 15.

The jaw portions 14 and 15 each have a pair of arcuate semi-circular areas 14a, 14b and 15a, 15b cut out of them and as will be noted in FIG. 1 when the jaws are closed, through circular openings 16 and 17 are thus provided and are intended to fit around the pipe or tube (not shown). In this regard, while the terms pipe and tube have been used interchangeably herein, tubing will be used henceforth with it being understood that the nomenclature is matter of choice.

The jaws 14 and 15 also have relieved areas 14c, 15c, which serve as a further heat dissipating factor as will be explained.

The outer periphery of the jaws and 14 and 15 in the form of the invention shown in FIG. 1, includes a plurality of fins 18, 18 radiating outwardly from a line passing through the center of the opening 16 and 17 in a radial direction.

The handle members 11 and 12 also have recesses which receive the legs 22, 22 of the tension means 20, which is illustrated as a spring, having a coiled portion 21 and projecting legs 22, 22. By virtue of this structure, the improved tool 10 is normally urged to the full line or closed position shown in FIG. 1. As noted above, this insures that once the handles 11 and 12 are released by the user, the tool will remain clamped in position about the tubing. Of course, pressure applied to the handles 11 and 12 will move the tool to the broken line position shown in FIG. 1 for either removal or attachment purposes.

In use or operation of the improved tool, it is merely necessary to grasp the handles 11 and 12, as noted above, and move the tool to the broken line position. At that time, the tool 10 can be positioned about the tube and, in this regard, it will be noted that the through apertures 16 and 17 are of different sizes. In most conventional plumbing, two standard sizes are employed and it is contemplated that the openings 16 and 17 would be sized so that these two standard sizes of tubing could be worked on with one tool.

However, it should be understood that the invention is not intended to be limited to two openings, as shown, but could employ only one or more than two and it should be also understood that no specific size is intended to be implied.

Once the tool 10 has been brought into proximity with the tubing it is merely necessary to release the handles 11 and 12 at which time the tension means 20 will autormtically cause the tool to move to the full line position of FIG. 1 and it will remain in place during the soldering operation. Heat traveling from the point of soldering down the tube will thus encounter the tool 10 and will be dissipated through the fins 18,18. Relieved areas 14c and 15c will also assist in dissipating the heat.

In this regard, it is contemplated that the tool 10 will be made of a good heat conducting material such as aluminium, although other materials could be utilized, if desired.

It is also contemplated that rubber or plastic handles 11a,12a could be slipped over the ends of the handles 11 and 12 for improved gripping purposes and for insulation purposes since heat will build up in the overall tool 10 during the soldering operation.

Figure 2:
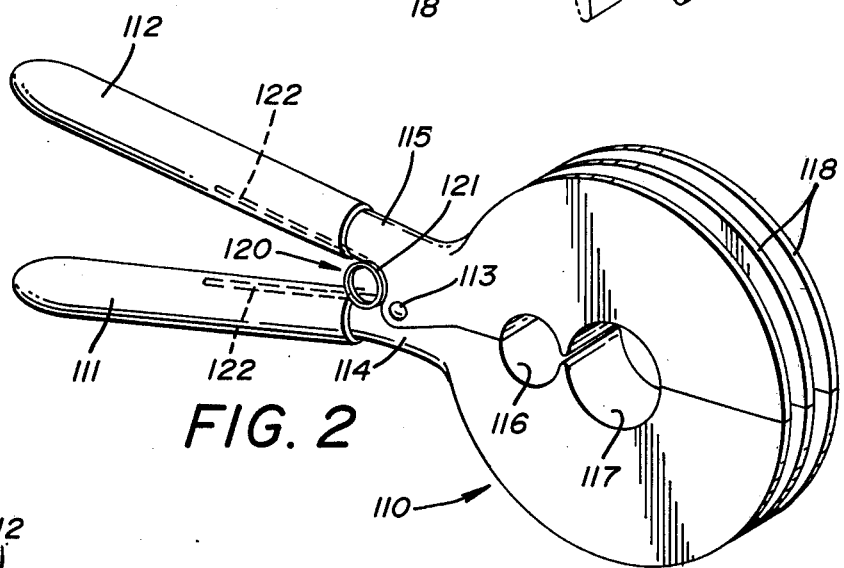
FIG. 2 is a perspective view similar to FIG. 1 showing a modified form of the invention.

FIG. 2 shows a modified form of the tool 110 wherein handles 111,111 have integral jaws 114,115 and are pivotally secured together as at 113. Tension means 120 are also employed and these tension means include the coiled portion 121 and legs 122,122 of the spring.

Tool 110 operates identically to tool 10, although the jaws have a different configuration wherein the fins 118,118 take the form of semi-circular ribs extending around the axis of the openings 116,117.

Figure 3:
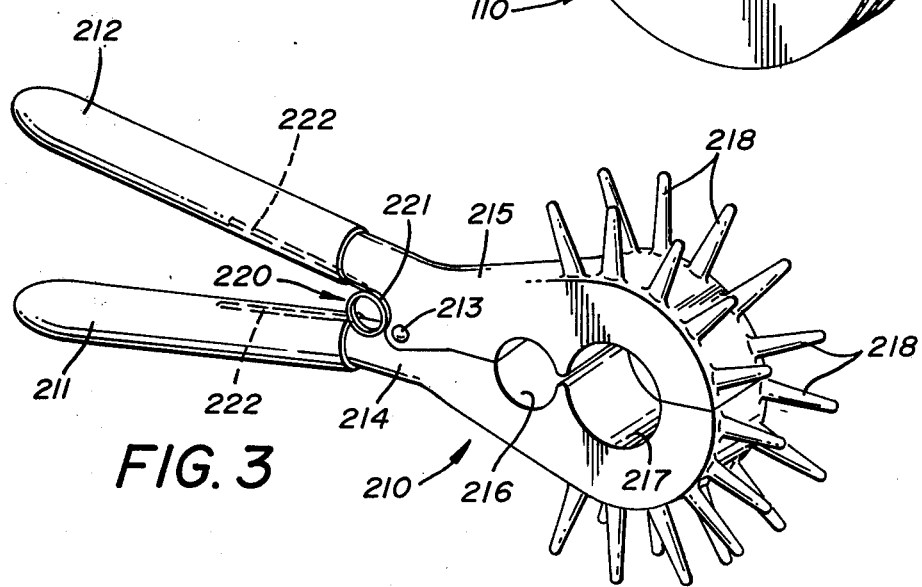
FIG. 3 is a perspective view showing a further modified form of the invention.

The modification of FIG. 3 shows a tool 210 having handles 211,212 pivotally secured to each other at 213 and terminating in jaws 214 and 215.

Again, tension means 220 include extended legs 222,222 and a coil member 221 and serve the same function as tension means 20 and 120 of the form of the invention shown in FIGS. 1 and 2.

Jaws 214,215 also have fins 218,218 which in this form of the invention take the configuration of spikes or elongate projections radiating outwardly from the axis of the openings 216,217.

This form of the invention functions in the same fashion as the forms described and illustrated with regard to FIGS. 1 and 2.

It should be noted that while the term "fins" has been utilized with regard to the heat dissipating members 118,118 and 218, that this terminology is illustrative only and, for the purposes of this application, are intended to cover all forms.

While a full and complete description has been set forth in accordance with the dictates of the patent statutes, it should be understood that modifications can be resorted to without departing from the spirit hereof or the scope of the appended claims.

Thus it should also be noted that while three forms of "fins" have been illustrated that some modifications could be made and the fins, ribs, etc. could take different configurations, if desired, without detracting from the structural principle of the inventive advance of this invention.

What is claimed is:

1. A heat shielding tool for use on tubing, comprising:
   A. a pair of elongate, pivotally connected handles;
   B. a pair of elongate jaws
      1. secured to and projecting coaxially from said handles and
      2. having opposed outer arcuate peripheral edge surfaces extending away from the central axis of each of said jaws;
   C. integral heat dissipation fins carried by said jaws and projecting radially from said outer arcuate peripheral edge surfaces and extending transversely thereof; and
   D. said jaws having at least one pair of tube engaging surfaces formed opposite said outer peripheral edge surfaces.

2. The tool of claim 1 wherein tension means are carried by said handles to normally urge said jaws toward each other and said jaws have two pairs of tube engaging surfaces.

3. The tool of claim 1 wherein insulating means are disposed on said handles.

4. The tool of claim 1 wherein said jaws have relieved areas between the point of connection of said handles and said tube engaging surfaces of said jaws.

* * * * *